United States Patent
Toeroe

(10) Patent No.: US 8,019,364 B2
(45) Date of Patent: Sep. 13, 2011

(54) METHODS FOR PROVIDING FEEDBACK IN MESSAGING SYSTEMS

(75) Inventor: Maria Toeroe, Montreal (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1300 days.

(21) Appl. No.: 11/614,721

(22) Filed: Dec. 21, 2006

(65) Prior Publication Data

US 2008/0155032 A1    Jun. 26, 2008

(51) Int. Cl.
*H04W 4/00* (2009.01)
(52) U.S. Cl. ..................... 455/466; 379/88.25
(58) Field of Classification Search ............... 379/88.25; 455/466
See application file for complete search history.

(56) References Cited

U.S. PATENT DOCUMENTS

| | | | | |
|---|---|---|---|---|
| 4,935,954 A | * | 6/1990 | Thompson et al. | 379/88.04 |
| 5,557,659 A | * | 9/1996 | Hyde-Thomson | 379/88.13 |
| 6,411,685 B1 | * | 6/2002 | O'Neal | 379/88.14 |
| 7,231,403 B1 | | 6/2007 | Howitt et al. | |
| 2004/0027995 A1 | | 2/2004 | Miller et al. | |
| 2004/0059789 A1 | | 3/2004 | Shum | |

OTHER PUBLICATIONS

PMDF System Manager's Guide, Feb. 2000, XP-002482375.
PCT Search Report from corresponding application PCT/IB2007/055034.

* cited by examiner

*Primary Examiner* — Simon Sing
(74) *Attorney, Agent, or Firm* — Ericsson Canada Inc.; Alex Nicolaescu

(57) ABSTRACT

Methods for providing feedback in messaging systems are described. A communication node can include a first counter for counting a first number of messages which received by and/or forwarded by the node. The communication node can also include a second counter which counts a second number of messages which are expected to be delivered from that node to other nodes.

14 Claims, 8 Drawing Sheets

METHODS FOR PROVIDING FEEDBACK IN MESSAGING SYSTEMS

BACKGROUND OF THE INVENTION

1. Field of the Invention

The present invention generally relates to messaging methods and, more particularly, to methods for providing feedback in messaging systems.

2. Description of the Related Art

Communication devices and systems in general, and messaging systems particular, continue to gain in popularity. Paging, instant messaging (IM) and text messaging on cell phones (e.g., SMS) are examples of messaging systems which have boomed in recent times. Of course like any communication system, administrators use various tools to monitor the performance of messaging systems and, when possible, attune system resources to improve performance in response to monitored events.

One important performance characteristic that system administrators will typically monitor in messaging systems is the number of lost or dropped messages, as well as other messaging "events" which may be relevant for system performance. In some types of messaging services, e.g., those which provide "guaranteed" delivery of each message, the delivery semantics provide feedback which can be used for this purpose. For example, in some message delivery services, a sending node transmits a message to a receiving node and awaits an acknowledgement signal from the receiving node. If the sending node does not receive an acknowledgment signal, e.g., within a predetermined time period, the sending node will retransmit the message to the receiving node. This process can continue until the sending node receives an acknowledgement signal from the receiving node for this particular message, thereby effectively guaranteeing delivery of messages. The received acknowledgment messages, as well as the number of required retransmissions, can be counted and used for message system management purposes.

On the other hand, not all messaging systems provide guaranteed delivery. Various quality-of-service (QoS) approaches to messaging are possible. One such alternative is commonly referred to as "best efforts" messaging. In best efforts messaging systems, messages are transmitted by a sending node and the system is designed to enhance the likelihood of delivery of the message as best possible. However, no explicit feedback is returned from the sender regarding its receipt of the transmitted message. Although best efforts messaging systems provide a lower quality of service than guaranteed delivery messaging systems (at least in terms of ultimate message delivery percentages), best efforts systems are still quite popular for some implementations because they require less bandwidth per message since they do not use bandwidth for, e.g., the transmission of acknowledgement messages.

One example of a best efforts messaging service can be found in the Events Service defined for high availability systems by the Service Availability Forum (SAF). High-availability systems (also known as HA systems) are systems that are implemented primarily for the purpose of improving the availability of services which the systems provide. The Events Service provides a publish/subscribe model for system events which facilitate monitoring those events in a manner which enables entities to provide desired level of availability. However, as defined, the Events Service is a best efforts type of messaging service, thus establishing a certain tension between its role within a high availability standard and its light-weight design.

Accordingly, it would be desirable to provide some feedback in best efforts message delivery methods which would enable a system administrator, or the like, to address failure modes in such messaging methods. However, it would also be desirable to do so without greatly increasing the resources used to handle message delivery.

SUMMARY OF THE INVENTION

According to an exemplary embodiment, a communication node can include a first counter for counting a first number of messages which are received by and/or forwarded, after reception, by the node. The communication node can also include a second counter which counts a second number of messages which are expected to be delivered from that node to other nodes.

According to another exemplary embodiment, a management node for use in a communication system includes a processor for transmitting a polling message. The polling message requests other nodes to each report a first number of messages which are at least one of: received by that node and forwarded, after reception, by that node. The polling message also requests other nodes to each report a second number of messages which are expected to be delivered from that node to at least one other node.

According to yet another exemplary embodiment, a method for providing feedback in a communication system includes a number of steps. A first message is received at a node. The node attempts to forward the first message to a user. In response to at least one of the reception of the first message or the delivery thereof, a first counter is incremented. A second message is sent by the node to at least one other node. In response to the transmission of the second message, a second counter is incremented.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE PREFERRED EMBODIMENTS

The following description of the exemplary embodiments of the present invention refers to the accompanying drawings. The same reference numbers in different drawings identify the same or similar elements. The following detailed description does not limit the invention. Instead, the scope of the invention is defined by the appended claims.

As mentioned above, best effort message services do not provide for feedback from the receiver side which confirms delivery of a message toward the sender. Moreover, the addition of a per-message feedback mechanism to a best effort message service would be undesirable due to its expense, i.e., in terms of additional bandwidth needed to service the feedback mechanism. However, these exemplary embodiments provide for delivery feedback, which can be used for system administration, without adding undue weight to the delivery system in terms of bandwidth utilization associated therewith. More specifically, these exemplary embodiments provide for delivery feedback based on counts in the delivery system on both the sender and the receiver sides, and comparisons of these counts by, e.g., a management node. In this context, it will be appreciated that a management node is an entity which manages resources associated with messaging within a system.

Figure 1:
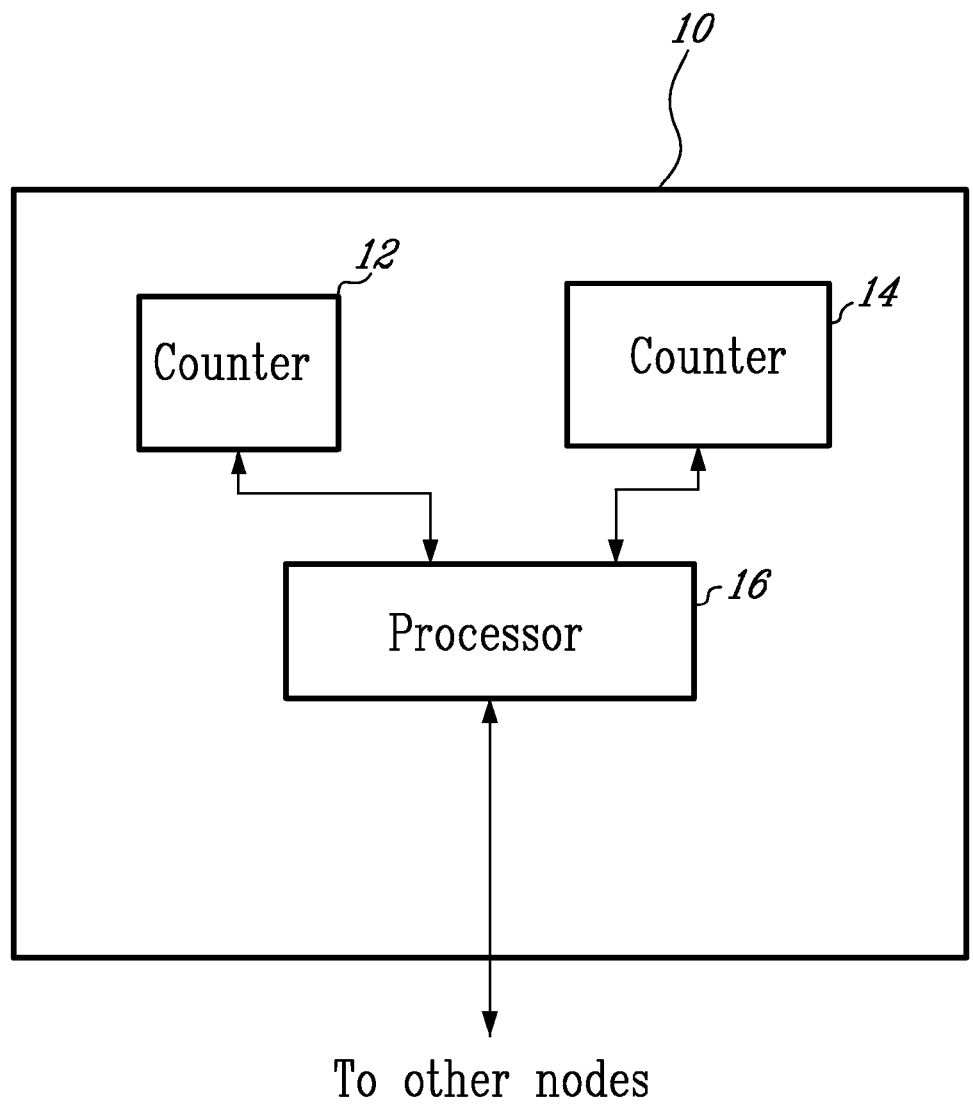
FIG. 1 illustrates a communication node according to an exemplary embodiment.

Accordingly, exemplary embodiments described herein use counts tallied within communication nodes in a messaging system relating to, for example, a first number of messages received by a node and a second number of messages expected, by that node, to be delivered. As shown in FIG. 1, this functionality can be provided by, for example, including within each node 10, a first counter 12 that counts either messages received by the node 10 and a second counter 14 that counts a number of messages that are expected to be delivered by the node 10. A processor 16 operates both to transmit messages from the node 10 and receive messages addressed to the node 10. Those skilled in the art will appreciate that the communication node 10 illustrated in FIG. 1 may take many alternative forms which may include other elements, e.g., a transceiver, memory devices, etc.

Figure 2:
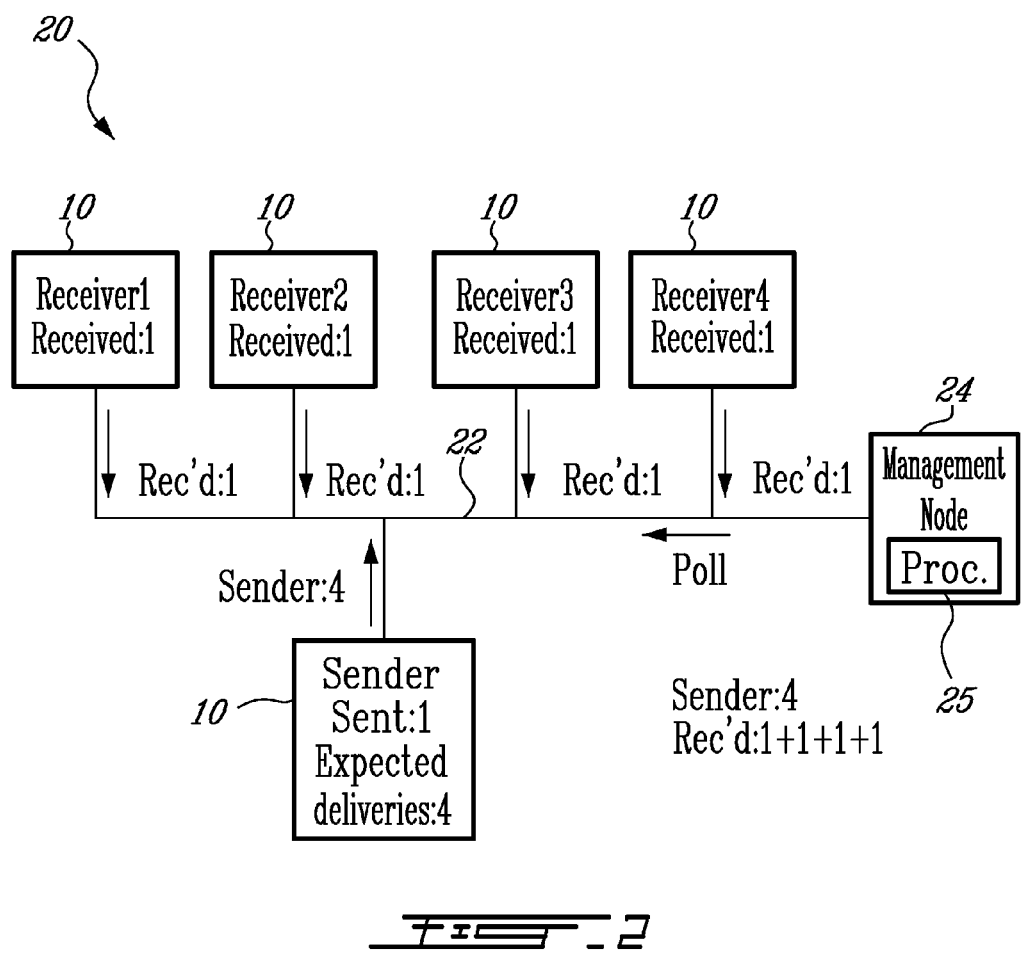
FIG. 2 illustrates a messaging system according to an exemplary embodiment.

Note that the second counter 14 described above is, according to exemplary embodiments, designed to count a number of messages expected to be delivered by the node 10 as opposed to counting the number of messages sent by the node 10. This distinction reflects the functionality found in most messaging systems wherein a single message can be addressed to multiple recipients. To better understand this point, consider the example illustrated in FIG. 2. Therein, a system 20 includes a plurality of communication nodes 10 connected to one another via an interconnect 22, which interconnect can be any combination or subcombination of communication links including, for example, wireline links, wireless links, switches, routers, the Internet, etc. Each of the communication nodes 10 illustrated in FIG. 2 includes the counters 12 and 14 and processor 16 described above with respect to FIG. 1. In this example, the bottommost communication node 10 in the figure is designated as the sender of a message. This purely illustrative message is addressed to each of the four upper communication nodes 10. Thus, if the counter 14 disposed within the sending node 10 were to count the number of messages sent by that node, it would count this message as one, but if, as according to these exemplary embodiments, it counts the number of messages expected to be delivered by that node, it would count this message as four, i.e.:

Number Of Sent Messages×Number Of Receivers=Number Of Messages Expected to be Delivered Counting the number of messages received and the number of messages expected to be delivered, by each node 10, provides the basis for exemplary embodiments to deliver feedback information relating to the performance of the best efforts messaging system 20. For example, as shown in FIG. 2, a management node 24 can send a polling message to each of the nodes 10. The management node 24 can, for example, include a processor 25 as well as any other desired communication elements used to manage resources associated with messaging. According to this exemplary embodiment, the polling message 10 requests the nodes 10 to deliver the numbers stored in their counters associated with (a) the number of messages received by that node 10 and (b) the number of messages expected to be delivered by that node 10. As shown in the example of FIG. 2, the bottommost node 10 returns, in response to the polling message, a reply indicating that it expected four messages to be delivered and had not received any messages. Each of the uppermost nodes 10 return a reply indicating that they had received one message and had not counted any messages that they expected to be delivered. The management node 24 will receive these replies and can then process them to determine that, during this latest polling period, the messaging system 20 is working at a 100% delivery ratio (expected to be delivered/received).

The frequency with which polling messages can be sent by, e.g., the management node 24, can vary depending upon the particular implementation. It will be appreciated that the more frequently that polling messages are sent out (shorter polling periods), and replies are transmitted in response thereto, the more bandwidth is being utilized by the feedback mechanism. On the other hand, the less frequently that polling messages are sent out (longer polling periods), the less information is available to the management function for adapting messaging system resources to tune performance.

Figure 3:
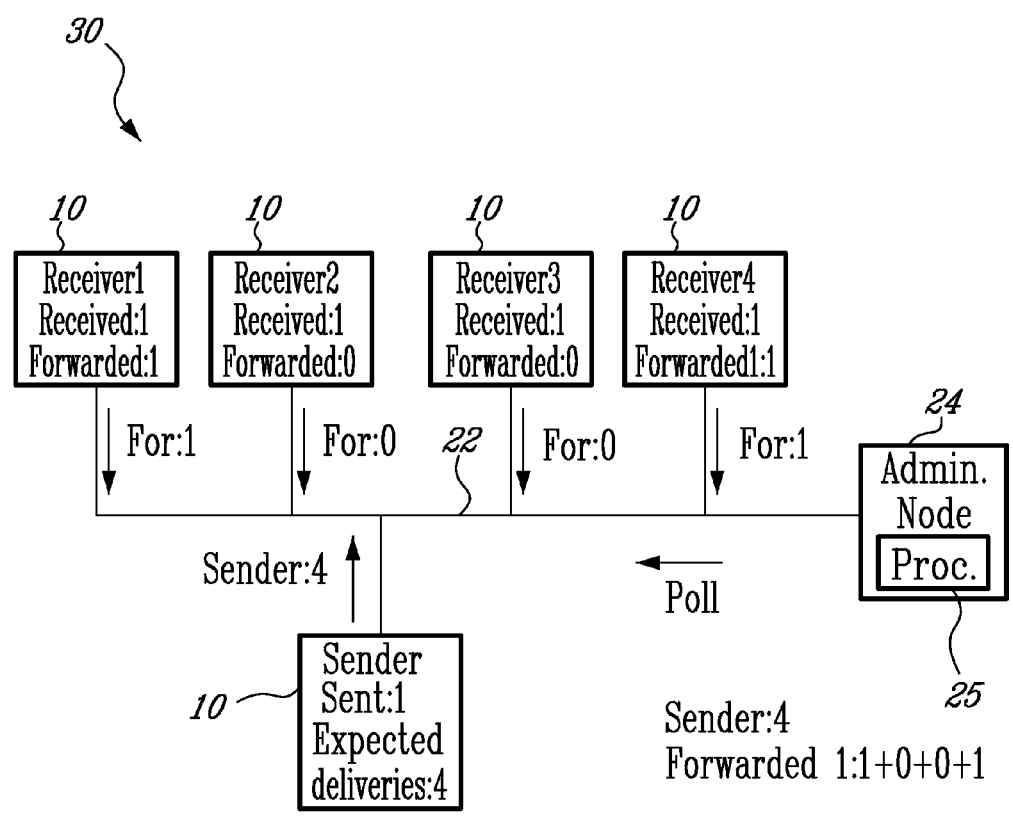
FIG. 3 shows a messaging system according to another exemplary embodiment.

Other exemplary embodiments can provide different types of feedback information. For example, in some messaging systems there may be a further distinction between messages which are received by a node 10 and messages which are actually forwarded by that node 10, e.g., to a consumer of messages such as another hardware element, a software application or a person, associated with that node 10. Messages which are received by a node 10 may be dropped before forwarding due to, e.g., buffer overflow. Consider this in the context of the exemplary messaging system 30 shown in FIG. 3. In this example, the counter 12 of each node 10 counts the number of messages which are forwarded after reception. Suppose that in an exemplary messaging scenario, the bottommost node 10 again sends a message which is addressed to all four of the uppermost communication nodes 10. All four of the uppermost nodes 10 receive the message, but two of the messages are dropped. Thus, when polled by the management node 24, two of the uppermost nodes 10 report that they forwarded one message each and two of the uppermost nodes 10 report that they did not forward any messages.

Figure 4:
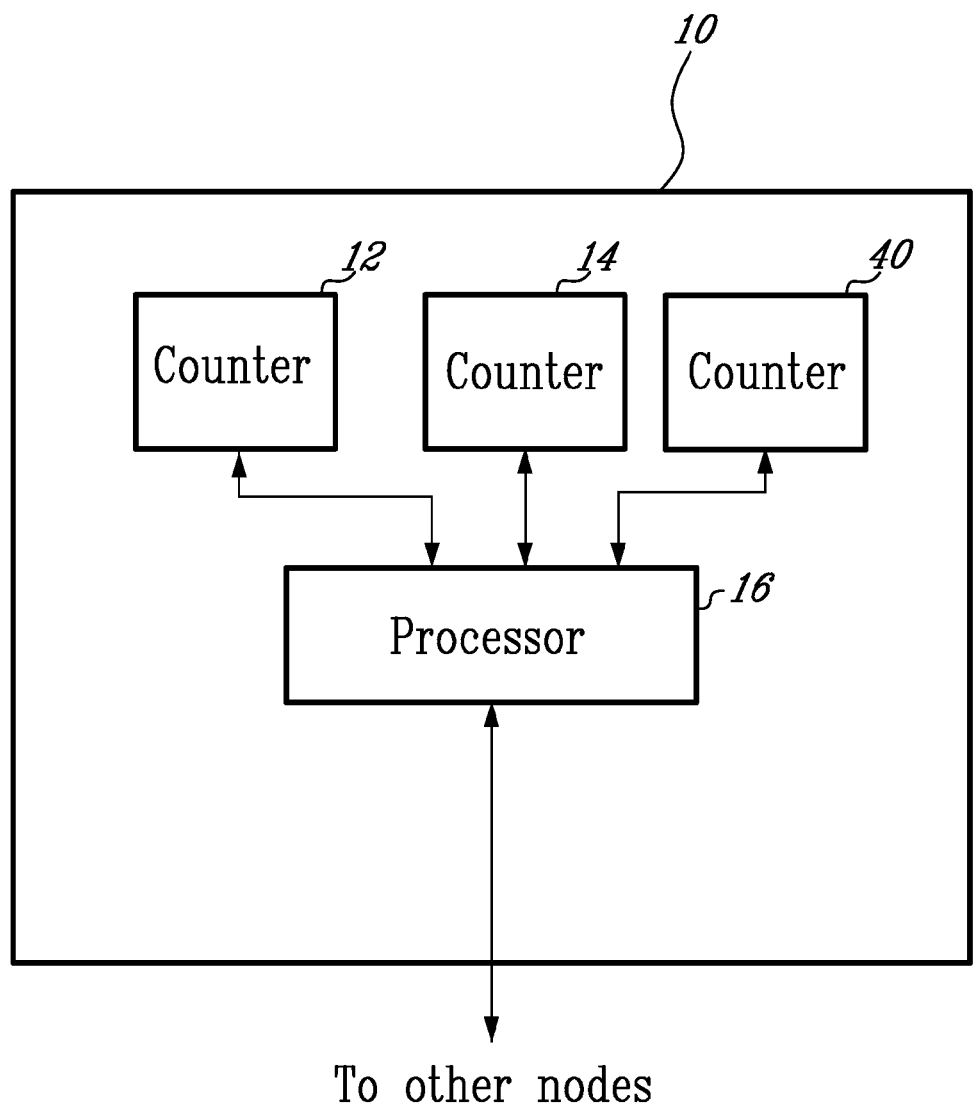
FIG. 4 depicts a communication node according to another exemplary embodiment.

Thus, it will be appreciated that, according to exemplary embodiments, a communication node 10 can include a first counter for counting either a first number of messages which are received by that node 10 or a first number of messages which are forwarded, after reception, by that node 10 and a second counter for counting a second number of messages which are expected to be delivered from the node 10 to other nodes 10. Alternatively, in order to be able to distinguish between reception failures and forwarding failures (e.g., buffer overflows), another exemplary embodiment of the present invention provides a third counter 40 to a communication node 10 as illustrated in FIG. 4.

Figure 5:
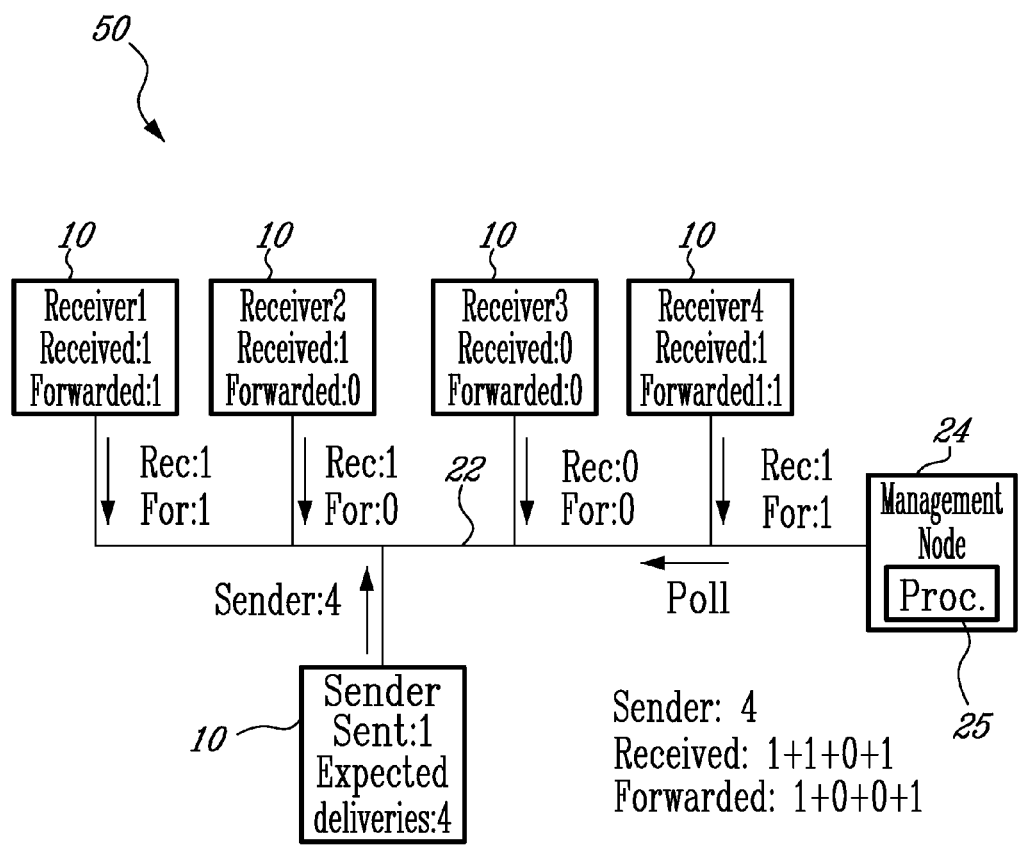
FIG. 5 shows a messaging system according to still another exemplary embodiment.

According to this exemplary embodiment, the counter 12 is used to count a number of messages received by the node 10, counter 14 is used to count a number of messages expected to be delivered by the node 10 to other nodes 10 and counter 40 is used to count a number of messages forwarded, after reception, by the node 10. In this way, when replying to a polling message from the management unit 24, communication nodes 10 can convey data which independently reports the number of messages that they received and the number of messages that they forwarded as shown in FIG. 5.

Therein, as in the previous examples, the system 50 includes a bottommost node 10 (labeled Sender) which sends a message to four recipient nodes 10. However, this time, in response to a polling message, the four uppermost communication nodes 10 reply with a count of both the number of messages that they have received and the number of messages that they have forwarded. In the exemplary embodiment of FIG. 5, the number of expected deliveries reported by the bottommost node 10 is four. Two of the uppermost communication nodes (labeled Receiver1 and Receiver4) report both reception and forwarding of messages, one of the uppermost communication nodes 10 (Receiver2) reports receipt of the message, but no messages being forwarded and the other communication node 10 (Receiver3) reports no receipt or forwarding of the message. This information allows the management unit to establish some different performance statistics, e.g., a 75% reception ratio and a 50% forwarding ratio in this example, and to distinguish between the type of failure which occurred during the delivery of the message to the communication node 10 labeled Receiver2 and the type of failure which occurred during the delivery of the message to the communication node 10 labeled Receiver3.

Figure 6:
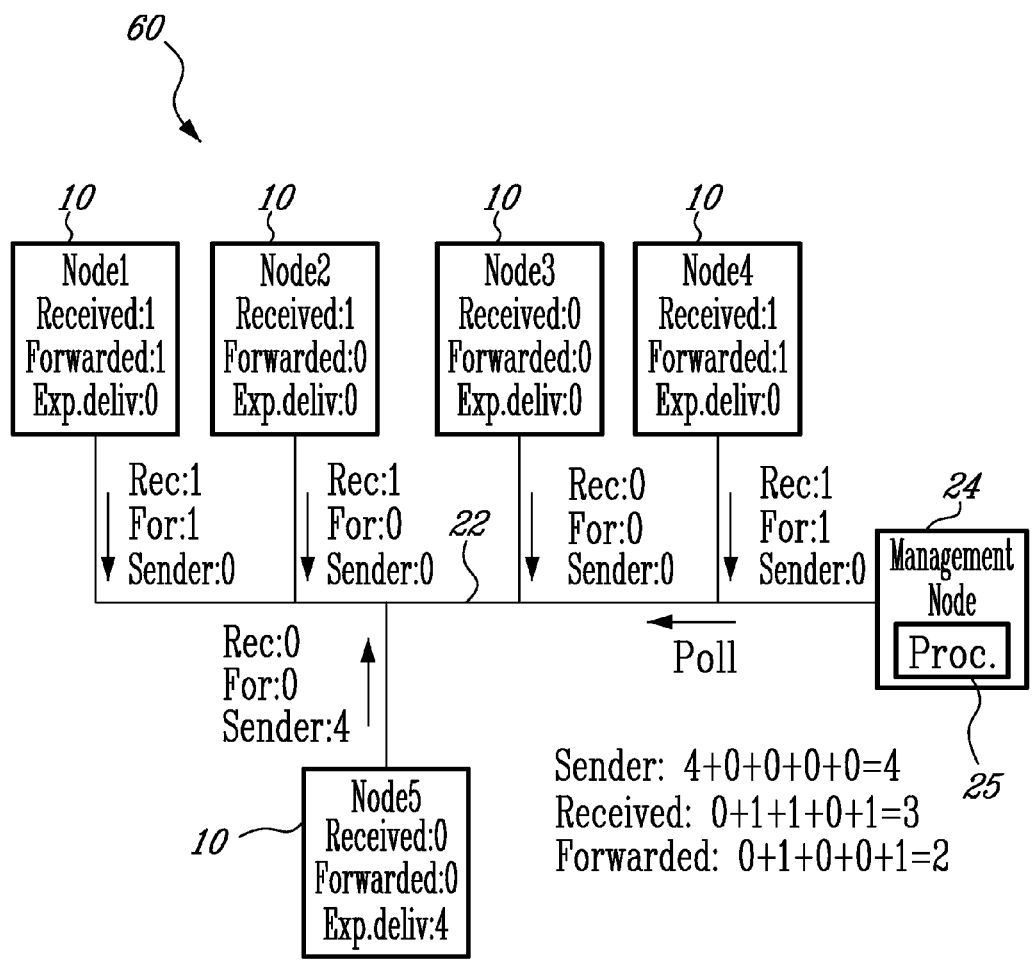
FIG. 6 illustrates yet another messaging system according to an exemplary embodiment.

The exemplary embodiment of FIG. 6 illustrates a system 60 which incorporates many of the above-described features. Therein, each communication node 10 can operate as both a sender and a receiver of messages. Three counters are provided in each communication node 10, e.g., as described and illustrated above with respect to FIG. 4. In response to a polling message from a management node 24, each communication node 10 will reply with the numbers stored in each of its three counters, as shown in the figure.

Figure 7:
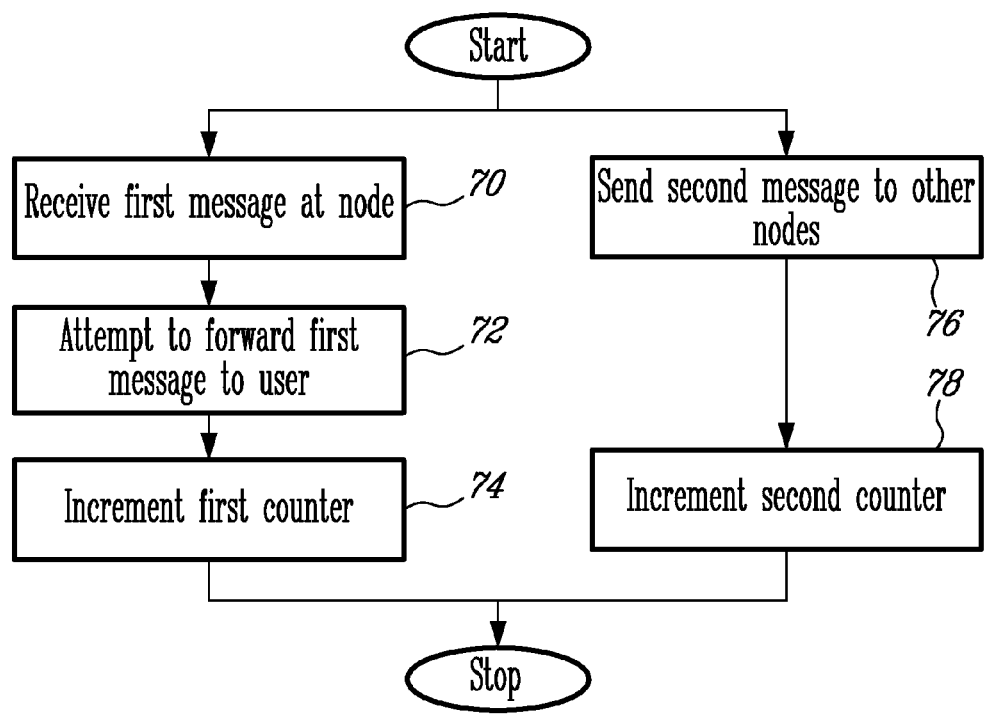
FIG. 7 is a flowchart illustrating a method according to an exemplary embodiment.

According to an exemplary embodiment, a method for providing feedback in a communication system can, therefore, include the steps illustrated in the flowchart of FIG. 7. Therein, at step 70, a first message is received at a node 10. The node 10 will attempt to forward the first message to a user at step 72. Note that, in this regard, a "user" associated with the node 10 can be a person, but can alternatively be another hardware node and/or a software application to which the message is being directed. Next, at step 74, a first counter 12 is incremented, either responsive to the receipt of the message or the forwarding thereof, in this exemplary two-counter embodiment. This same node 10 may, either before receiving the first message or afterward, send a second message to at least one other node as indicated by step 76. This transmission will cause a second counter 14 to be incremented, i.e., incremented by a number of times which is equal to the number of intended recipient(s) of the second message, at step 78. It should be noted that the group of steps (70, 72 and 74) illustrated on the left-hand side of the flowchart and the group of steps (76 and 78) illustrated on the right-hand side of the flowchart of FIG. 7 can be performed independently of one another and either group may be omitted.

Figure 8:
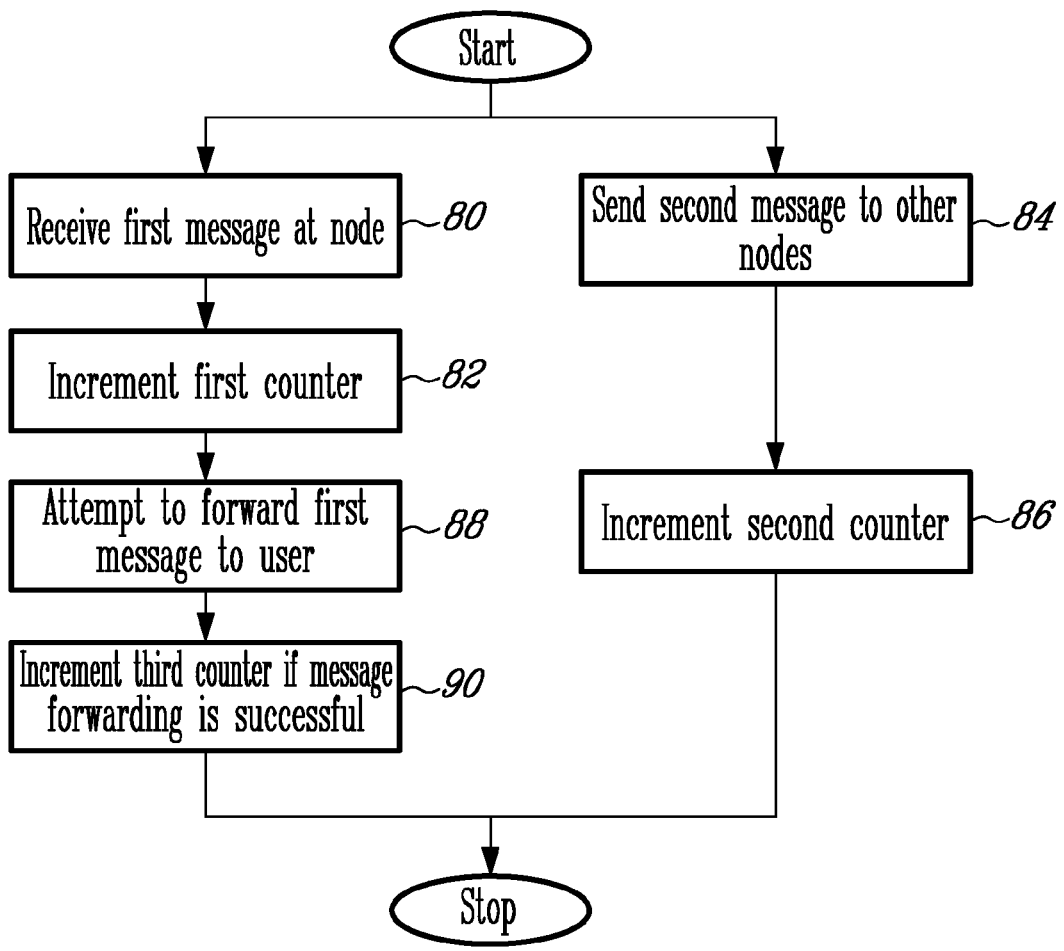
FIG. 8 is a flowchart illustrating a method according to another exemplary embodiment.

According to another exemplary embodiment, having at least three counters per node, a method for providing feedback in a communication system can include the steps illustrated in the flowchart of FIG. 8. Therein, at step 80, a first message is received at a node 10. Then, at step 82, a first counter 12 is incremented, which counter tracks the number of messages received by that node 10. At step 88, the node 10 will attempt to forward the first message to a user. Note that, in this regard, a "user" associated with the node 10 can be a person, but can alternatively be another hardware node and/or a software application to which the message is being directed.

Next, at step 90, a third counter 40 is incremented, if the forwarding of the first message is successful. This same node 10 may, either before receiving the first message or afterward, send a second message to at least one other node as indicated by step 84. This transmission will cause the second counter 14 to be incremented, i.e., incremented by a number of times which is equal to the number of intended recipient(s) of the second messages, at step 86. It should be noted that the group of steps (80, 82, 88 and 90) illustrated on the left-hand side of the flowchart and the group of steps (84 and 86) illustrated on the right-hand side of the flowchart of FIG. 8 can be performed independently of one another and either group may be omitted.

It will be appreciated by those skilled in the art that the foregoing exemplary embodiments can be implemented in many different types of best efforts messaging systems including, but not limited to, those which provide the Events Service associated with the Application Interface Services promulgated by the SAF. The reader interested in more information relating to the AIS and/or HPI standard specification is referred to Application Interface Specifications (AIS), Version B.02.01 and Hardware Platform Interface Specifications (HPI), Version B.01.01, both of which are available at www.saforum.org. Moreover, these exemplary embodiments are likewise applicable to any other types of systems wherein the intended recipients are known to the sender and messaging is performed using a best efforts delivery mechanism or the like. Other variations on the foregoing are also possible. For example, if different classes of message service are provided, each class of service could have a corresponding set of counters per class so that delivery feedback can be provided on a per class basis.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A communication node comprising:
a first counter for counting a first number of messages which are at least one of:
(a) received by said node and (b) forwarded, after reception, by said node; and
a second counter for counting a second number of messages which are expected to be delivered from said node to other nodes;
wherein the second number of messages is given by a number of delivered messages times a number of receivers.

2. The communication node of claim 1, wherein said first counter counts said first number of messages which are (a) received by said node, and further comprising:
a third counter for counting a third number of messages which are forwarded, after reception, by said node.

3. The communication node of claim 1, further comprising:
a processor for receiving said messages at said node and for sending said messages expected to be delivered from said node to other nodes.

4. The communication node of claim 3, wherein said processor receives a polling message and, in response thereto, transmits a reply indicating said first number and said second number.

5. The communication node of claim 2, further comprising a processor for receiving said messages at said node and for sending said messages expected to be delivered from said node to other nodes, wherein said processor receives a polling message and, in response thereto, transmits a reply indicating said first number, said second number and said third number.

6. The communication node of claim 3, wherein said processor does not send an acknowledgement message in response to receipt of said messages at said node.

7. The communication node of claim 2, wherein said third number of messages which are forwarded by said node are forwarded to a user of said node.

8. A management node for use in a communication system, said management node comprising:
   a processor for transmitting a polling message requesting other nodes to each report a first number of messages which are at least one of: (a) received by that node and (b) forwarded, after reception, by that node and a second number of messages which are expected to be delivered from that node to at least one other node;
wherein the second number of messages is given by a number of delivered messages times a number of receivers.

9. The management node of claim 8, wherein said first number of messages requested by said polling message is a number of messages which are received by that node and wherein said polling message further requests:
   a third number of messages which are forwarded, after reception, by that node.

10. A method for providing feedback in a communication system comprising the steps of:
   receiving a first message at a node;
   attempting to forward said first message to a user;
   incrementing, in response to at least one of said receiving and attempting steps, a first counter associated with a first number of messages which are at least one of received by said node and forwarded by said node;
   sending a second message from said node to at least one other node; and
   incrementing, in response to said step of sending, a second counter associated with a second number of messages which are expected to be delivered from said node to other nodes.

11. The method of claim 10, wherein said first number of messages is a number of messages which are received by said node and further comprising the step of:
   incrementing, if said attempted forwarding of said first message is successful, a third counter associated with a third number of messages which are forwarded by said node.

12. The method of claim 10, further comprising the step of:
   receiving a polling message and, in response thereto, transmitting a reply indicating said first number and said second number.

13. The method of claim 11, further comprising the step of:
   receiving a polling message and, in response thereto, transmitting a reply indicating said first number, said second number and said third number.

14. The method of claim 10, further comprising the step of:
   not sending an acknowledgement message in response to receipt of said messages at said node.

* * * * *